No. 759,932. PATENTED MAY 17, 1904.
T. L. & T. J. STURTEVANT.
PNEUMATIC TIRE GUARD.
APPLICATION FILED JAN. 13, 1904.
NO MODEL.
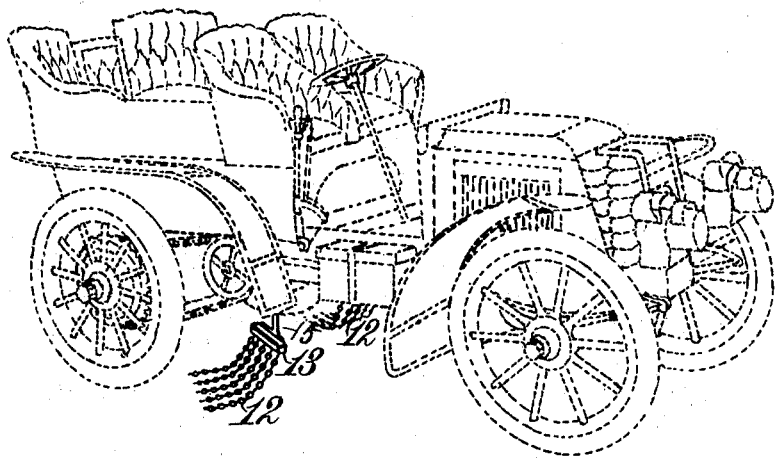
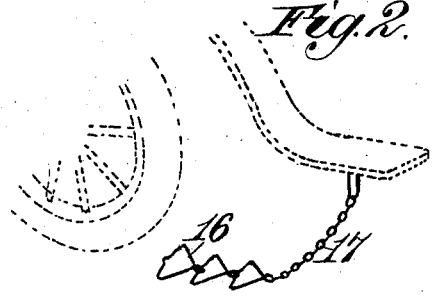
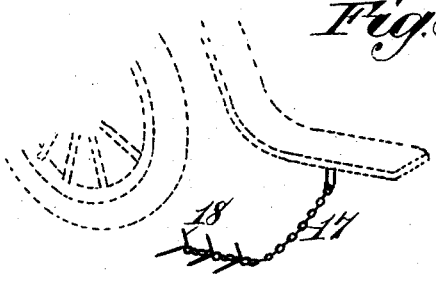
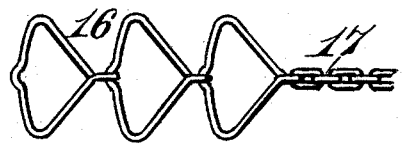
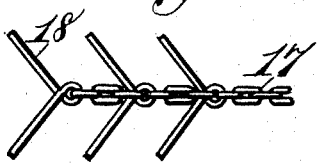

No. 759,932. Patented May 17, 1904.

UNITED STATES PATENT OFFICE.

THOMAS LEGGETT STURTEVANT, OF QUINCY, AND THOMAS J. STURTEVANT, OF WELLESLEY, MASSACHUSETTS.

PNEUMATIC TIRE-GUARD.

SPECIFICATION forming part of Letters Patent No. 759,932, dated May 17, 1904.

Application filed January 13, 1904. Serial No. 188,867. (No model.)

*To all whom it may concern:*

Be it known that we, THOMAS LEGGETT STURTEVANT, residing at Quincy, and THOMAS J. STURTEVANT, residing at Wellesley, in the county of Norfolk and State of Massachusetts, both citizens of the United States, have invented certain new and useful Improvements in Pneumatic-Tire Guards, of which the following is a specification, reference being had therein to the accompanying drawings.

It is a well-known fact that pneumatic tires in use with various kinds of vehicles are liable to be cut or punctured by contact with sharp stones or nails, tacks, or other bits of metal in the roadways, and this is particularly so with regard to the pneumatic tires of automobiles.

This invention has for its object to avoid the difficulty referred to by providing dragging road-brushes, arranged in front of the wheels of the vehicles and consisting, preferably, of chains the links of which will mechanically push aside injurious articles or clear the tracks for the wheels. These dragging chain-brushes or tire-guards may be made of various styles, and will preferably be permanently magnetized, so that they will be adapted to pick up tacks or other bits of iron or steel which are liable to puncture the pneumatic tires.

In the accompanying drawings, Figure 1 shows in dotted outline an automobile provided with one form of the improved tire-guard. Figs. 2 and 3 illustrate other forms of the improved tire-guard arranged to drag in front of pneumatically-tired wheels, and Figs. 4 and 5 are detail views of the forms of dragging tire-guards shown in Figs. 2 and 3.

The form of tire-guard shown in Fig. 1 consists of a series of chains 12, suspended from blocks or carriers 13, preferably arranged at an oblique angle to the direction of movement of the vehicle and in front of the wheels thereof, so as to push aside any articles or obstacles liable to injure the wheels of such vehicle, said block or carriers being provided with any suitable shanks 15 for attachment to any convenient part of the vehicle.

The tire-guards shown in Figs. 2 and 4 consist of a series of triangular links 16, arranged to drag on the ground with their pointed ends foremost and flexibly connected by chains 17 to any suitable supports on the vehicle.

The tire-guards shown in Figs. 3 and 5 consist of a series of metallic winged brushes 18, suitably linked together and arranged with their pointed ends foremost, these winged brushes being also flexibly connected by chains 17 with any suitable supports on the vehicle.

All the different forms of the dragging chain-brushes or tire-guards shown will preferably be of iron or steel permanently magnetized, so that in addition to their mechanical action in brushing aside articles or obstacles liable to injure the pneumatic tires they will also be adapted to pick up nails, tacks, or other bits of iron or steel liable to injure such tires. These improved tire-guards, consisting of triangular links or winged shields, several of which will preferably be arranged to drag on the ground, are particularly efficient in their operation in that they are successively or cumulatively in such a way that an article or obstacle which may escape the first of these dragging-brushes can hardly escape them all, as the brushing action is repeated by each successive dragging-link.

The various forms of the chain road-brushes or tire-guards herein shown and described will be preferably attached to the vehicles non-elastically or non-yieldingly, but somewhat weakly, so that if they should catch upon an object or obstacle with such a strong hold that the vehicle is liable to injury the attachment will be broken, and these chain tire-guards will be so arranged relative to the wheels of a vehicle that when the latter is reversed in its movement they cannot get beneath the wheels of such vehicle. They may also be arranged to guard either the front or the rear wheels of the vehicle, or both, although the rear wheels, which are usually the driving-wheels and which have greatest traction on the road, are more liable to injury than the front wheels, and it is, therefore, more important that such driving-wheels should be guarded, as will be understood.

While we have herein shown our improved road-brush tire-guards as consisting of dragging-chains of various forms as being the best embodiment of our invention, we do not wish to be understood as being limited to chains, either for the dragging or suspending portions of our improved road-brush tire-guards, as the invention comprises any form of dragging flexible device to be arranged in front of pneumatically-tired wheels, and may therefore consist of dragging-ropes, either metallic or non-metallic, and which may or may not be provided with one or more angular rearwardly-spreading links or drags, as 16 or 18, or of other equivalent form. Also instead of chains 17 for suspending the dragging road-brush tire-guards from the vehicles, ropes or cords, either of metal or other material, might be employed for this purpose.

Having thus described our invention, we claim and desire to secure by Letters Patent—

1. A road-brush tire-guard, for automobiles or other vehicles, consisting of a flexible device connected with a vehicle and a portion of which is arranged normally to drag on the ground in front of the wheel the tire of which is to be guarded.

2. A road-brush tire-guard, for automobiles or other vehicles, consisting of a flexible device connected with the vehicle and a portion of which is arranged to drag on the ground in front of the wheel the tire of which is to be guarded, said road-brush tire-guard comprising one or more rearwardly-spreading and flexibly-connected elements.

3. A road-brush tire-guard, for automobiles or other vehicles, consisting of a flexible device connected with the vehicle and a portion of which is arranged to drag on the ground in front of the wheel the tire of which is to be guarded, said road-brush tire-guard comprising one or more rearwardly-spreading and flexibly-connected magnetized metallic elements.

4. A road-brush tire-guard, for automobiles or other vehicles, consisting of a chain or chains of metal, connected with a vehicle, and portions of which are arranged normally to drag on the ground in front of the wheel the tire of which is to be guarded.

5. A road-brush tire-guard, for automobiles or other vehicles, consisting of a chain or chains of metal, portions of which are arranged to drag on the ground in front of the wheel the tire of which is to be guarded, said chain or chains being permanently magnetized so as to be adapted to pick up nails, tacks, &c., liable to injure or puncture pneumatic tires.

6. A road-brush tire-guard, for automobiles or other vehicles, consisting of a chain or chains of metal, portions of which are arranged to drag on the ground in front of the wheel the tire of which is to be guarded, the dragging portions of said tire-guarding chain or chains consisting of triangular or winged links attached together and arranged to drag with their pointed ends foremost.

7. A road-brush tire-guard, for automobiles or other vehicles, consisting of a plurality of rearwardly-spreading and flexibly-connected road-brushing links or elements arranged to drag on the ground in front of a wheel and flexibly suspended from the vehicle.

8. A road-brush tire-guard, for automobiles or other vehicles, consisting of a plurality of rearwardly-spreading and flexibly-connected road-brushing links or elements arranged to drag on the ground in front of a wheel and flexibly suspended from the vehicle, said road-brushing links or elements being of magnetized metal.

In testimony whereof we affix our signatures in presence of two witnesses.

THOMAS LEGGETT STURTEVANT.
THOMAS J. STURTEVANT.

Witnesses:
W. T. ELLIS,
RUBERT M. GAY.